United States Patent Office 3,673,003
Patented June 27, 1972

3,673,003
THERMOCOUPLE FOR NUCLEAR ENVIRONMENT
Carrol Dean Starr, Whippany, and Teh Po Wang, Cedar Grove, N.J., assignors to Wilbur B. Driver Company
No Drawing. Filed Sept. 18, 1969, Ser. No. 859,203
Int. Cl. H01v 1/22
U.S. Cl. 136—236      5 Claims

ABSTRACT OF THE DISCLOSURE

A thermocouple which exhibits substantially no change in composition when exposed to neutron irradiation. The positive thermoelement of this thermocouple comprises, as expressed in percent by weight:

8%–10% chromium;
0%–1.5% silicon; and
Balance—nickel

The negative thermoelement of this thermocouple comprises, as expressed in percent by weight:

25%–35% chromium;
0%–1.5% silicon; and
Balance—nickel

BACKGROUND OF THE INVENTION

Conventional thermocouples, when exposed to nuclear irradiation for prolonged period as, for example, when used for temperature measurements in nuclear power reactors, exhibit changes in calibration which reduce the accuracy of temperature measurement to an unacceptable extent.

The changes in calibration are produced because of changes in composition of the positive and/or negative thermoelements. Such composition changes occur because of the transmutation of one or more of the constituents of the thermoelements.

We have developed a new thermocouple using only nickel, chromium and (optionally) silicon. Their elements exhibit substantially no change in composition (i.e. do not transmute) when subjected to nuclear irradiation over prolonged period.

As a result, our thermocouple maintains an unchanged calibration when employed in nuclear environments and the accuracy of temperature measurement is unimpaired.

SUMMARY OF THE INVENTION

We have developed a new thermocouple which can be used in a nuclear environment without exhibiting changes in calibration to measure temperatures within a selected range typically, 32° F. to 1,500° F. Our thermocouple uses nickel based alloys for both positive and negative thermoelements. The positive thermoelement comprises, as expressed in percent by weight:

8%–10% chromium;
0%–1.5% silicon; and
Balance—nickel

The negative thermoelement comprises, as expressed in percent by weight:

25%–35% chromium
0%–1.5% silicon; and
Balance—nickel

DETAILED DESCRIPTION OF PREFERRED EMBODIMENTS

A table comparing the difference in the electromotive force (EMF) yielded between the positive and negative thermoelements as a function of temperature where the positive thermoelement alloy composition is 91% nickel, 9% chromium and the negative thermoelement alloy composition is 68.5% nickel, 30% chromium, and 1.5% silicon is shown below:

| EMF (in millivolts): | Temperature (° F.) |
|---|---|
| 0 | 32 |
| 3.1 | 300 |
| 6.0 | 500 |
| 9.9 | 800 |
| 12.0 | 1000 |
| 14.0 | 1200 |
| 16.0 | 1500 |

While the EMF at any temperature within the range set forth above will be reduced when the compositions set forth above are modified by changing the chromium content, acceptable results can still be obtained if the chromium content of the positive element is held within the range 8%–10% and the chrominum content of the negative element is held within the range 25%–35%.

The elements need not contain silicon for the purposes of withstanding neutron irridiation. However, the addition of silicon to any element in an amount up to 1.5% can enhance the oxidation resistance of this element. Moreover, when silicon is added in amounts up to 1.5% to the negative thermal element, its EMF will become more negative and the differential EMF yielded between the positive and negative thermal elements will be correspondingly increased.

The metals used herein can be of normal commercial grade and need not be ultra pure.

What is claimed is:

1. A thermocouple consisting essentially of a positive thermoelement consisting essentially of a first nickel base chromium alloy and a negative thermoelement consisting essentially of a second nickel base chromium alloy having a greater chromium content than said first alloy, said thermocouple being further characterized by exhibiting essentially no change in composition due to transmutation when exposed to neutron irridation.

2. A thermocouple as set forth in claim 6 wherein the positive thermoelement has the following composition:

8%–10% chromium;
0%–1.5% silicon; and
Balance—nickel.

3. A thermocouple as set forth in claim 2 wherein the negative thermoelement has the following composition:

25%–35% chromium;
0%–1.5% silicon; and
Balance—nickel.

4. A thermocouple as set forth in claim 3 wherein the positive thermoelement contains 9% chromium and the negative thermoelement contains 30% chromium.

5. A thermocouple as set forth in claim 4 wherein each thermoelement contains 1.5% silicon.

References Cited
UNITED STATES PATENTS

| 2,705,747 | 4/1955 | Strange | 136—236 X |
| 2,859,264 | 11/1958 | Hunter | 136—236 X |
| 2,990,440 | 6/1961 | Obrowski et al. | 136—236 X |
| 3,411,956 | 11/1968 | Sibley | 136—236 |

BENJAMIN R. PADGETT, Primary Examiner

H. E. BEHREND, Assistant Examiner

U.S. Cl. X.R.

136—239; 176—19 R

PO 1050
(5/69)

UNITED STATES PATENT OFFICE
CERTIFICATE OF CORRECTION

Patent No. 3,673,003      Dated June 27, 1972

Inventor(s) Carroll Dean Starr and Teh Po Wang

It is certified that error appears in the above-identified patent and that said Letters Patent are hereby corrected as shown below:

Col. 2, line 22 - "irridiation" should read "irradiation"

Claim 1, line 8 - "irridation" should read "irradiation"

Claim 2, line 1 -     "6"     should read     "1"

Signed and sealed this 17th day of October 1972.

(SEAL)
Attest:

EDWARD M. FLETCHER, JR.
Attesting Officer

ROBERT GOTTSCHALK
Commissioner of Patents